US012181824B2

(12) United States Patent
Shao et al.

(10) Patent No.: US 12,181,824 B2
(45) Date of Patent: Dec. 31, 2024

(54) IMAGE-FORMING APPARATUS, CORRECTION CONTROL METHOD, AND STORAGE MEDIUM

(71) Applicant: Zhuhai Pantum Electronics Co., Ltd., Zhuhai (CN)

(72) Inventors: Zhe Shao, Zhuhai (CN); Shiyan Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/299,757

(22) Filed: Apr. 13, 2023

(65) Prior Publication Data

US 2024/0004335 A1 Jan. 4, 2024

(30) Foreign Application Priority Data

Jul. 4, 2022 (CN) ........................ 202210785683.0

(51) Int. Cl.
*G03G 15/00* (2006.01)
*G03G 15/01* (2006.01)
*G03G 15/08* (2006.01)

(52) U.S. Cl.
CPC ..... *G03G 15/5062* (2013.01); *G03G 15/0121* (2013.01); *G03G 15/0855* (2013.01); *G03G 15/5058* (2013.01); *G03G 2215/00059* (2013.01); *G03G 2215/0161* (2013.01)

(58) Field of Classification Search
CPC ........... G03G 15/5054; G03G 15/5058; G03G 15/5062; G03G 15/0855; G03G 2215/00059; G03G 2215/0158; G03G 2215/0161
See application file for complete search history.

(56) References Cited

U.S. PATENT DOCUMENTS 6,341,205 B1 * 1/2002 Yoshino ............... G03G 15/168 399/101
2012/0045234 A1 * 2/2012 Suzuki ............... G03G 15/5058 399/49
2013/0302050 A1 * 11/2013 Shimba ............. G03G 15/5058 399/49
2015/0286179 A1 10/2015 Sugiyama

* cited by examiner

*Primary Examiner* — Carla J Therrien
(74) *Attorney, Agent, or Firm* — ANOVA LAW GROUP PLLC

(57) ABSTRACT

The present disclosure provides an image-forming apparatus, a correction control method and a storage medium. The apparatus includes an image carrier; a pattern-forming unit, configured to form a first detection pattern for density detection on the image carrier, where the first detection pattern includes a black first-sub-pattern and a non-black second-sub-pattern; and further configured to form a second detection pattern for misregistration detection on the image carrier, where the second detection pattern includes a full-color third-sub-pattern and a full-color fourth-sub-pattern, and the third-sub-pattern is different from the fourth-sub-pattern; a first sensor, configured to perform the density detection on the first-sub-pattern and the misregistration detection on the third-sub-pattern; and a second sensor, configured to perform the density detection on the second-sub-pattern, and the misregistration detection on the fourth-sub-pattern.

12 Claims, 4 Drawing Sheets

IMAGE-FORMING APPARATUS, CORRECTION CONTROL METHOD, AND STORAGE MEDIUM

CROSS-REFERENCE TO RELATED APPLICATION

This application claims the priority to Chinese patent application No. 202210785683.0, filed on Jul. 4, 2022, in the China National Intellectual Property Administration, the entirety of which is incorporated herein by reference.

TECHNICAL FIELD

The present disclosure generally relates to the field of image-forming technology and, more particularly, relates to an image-forming apparatus, a correction control method, and a storage medium.

BACKGROUND

Certain existing image-forming apparatuses are capable of performing color image-forming jobs. For example, the image-forming apparatus can execute color printing jobs based on four color toners of black (K), magenta (M), cyan (C), and yellow (Y).

Image-forming apparatuses normally need to perform certain corrections before operations, including toner density detection, misregistration detection and the like, which ensures that the image-forming apparatuses can more accurately control the density and image-forming position of each color toner and improve image-forming quality.

Certain image-forming apparatus may include a plurality of image-forming units and multicolor images may be formed by forming images of various colors using the image-forming units and then transferring the images to an intermediate transfer part or a recording material in a superimposed manner. Color shift and misregistration, that is, relative positional mismatch between images formed by the image-forming units, may occur in such type of image-forming apparatus. Misregistration may occur due to installation errors of parts of the image-forming units, and relative position changes of such parts due to changes in environmental conditions such as temperature. Misregistration may also occur due to uneven rotation of rotating driven parts, rotation speed change, and the like. In addition, color balance (e.g., tone) may change due to changes in image density of each color caused by conditions such as usage environment and the number of printed sheets.

The defect of the existing technology, on the one hand, may be that different corrections are performed in different time series, that is, the density correction and the misregistration detection are detected at different times, and different detection images are formed on a conveying belt for detection, so that more time and cost may be needed for detection before the image-forming operations may be performed. On the other hand, the defect of the existing technology may be related to the cost of using sensors. In the existing technology, when performing misregistration detection, same color images may be normally formed on the left and right sides of the conveying belt, and IDC (image density control) sensors may be installed on the left and right sides of the conveying belt for detection. Due to the property of toner colors, black toner may need to be detected through a specular reflection channel in the sensor, while color toners with other colors may need to be detected through a diffuse reflection channel. Therefore, the specular reflection channel and the diffuse reflection channel may need to be configured in the left and right sensors, which may have relatively high usage cost of the sensors.

SUMMARY

One aspect of the present disclosure provides an image-forming apparatus. The apparatus includes an image carrier; a pattern-forming unit, configured to form a first detection pattern for density detection on the image carrier, where the first detection pattern includes a black first-sub-pattern and a non-black second-sub-pattern; and further configured to form a second detection pattern for misregistration detection on the image carrier, where the second detection pattern includes a full-color third-sub-pattern and a full-color fourth-sub-pattern, and the third-sub-pattern is different from the fourth-sub-pattern; a first sensor, configured to perform the density detection on the first-sub-pattern and the misregistration detection on the third-sub-pattern; and a second sensor, configured to perform the density detection on the second-sub-pattern, and the misregistration detection on the fourth-sub-pattern.

Another aspect of the present disclosure provides a correction control method. The method includes forming a first detection pattern for density detection on an image carrier, where the first detection pattern includes a black first-sub-pattern and a non-black second-sub-pattern; controlling a first sensor to perform the density detection on the first-sub-pattern, and controlling a second sensor to perform the density detection on the second-sub-pattern; forming a second detection pattern for misregistration detection on the image carrier, where the second detection pattern includes a full-color third-sub-pattern and a full-color fourth-sub-pattern, and the third-sub-pattern is different from the fourth-sub-pattern; and controlling the first sensor to perform the misregistration detection on the third-sub-pattern and controlling the second sensor to perform the misregistration detection on the fourth-sub-pattern.

Another aspect of the present disclosure provides a non-transitory computer-readable storage medium containing a computer program, and when being executed, the computer program causes a processor to implement a correction control method. The method includes forming a first detection pattern for density detection on an image carrier, where the first detection pattern includes a black first-sub-pattern and a non-black second-sub-pattern; controlling a first sensor to perform the density detection on the first-sub-pattern, and controlling a second sensor to perform the density detection on the second-sub-pattern; forming a second detection pattern for misregistration detection on the image carrier, where the second detection pattern includes a full-color third-sub-pattern and a full-color fourth-sub-pattern, and the third-sub-pattern is different from the fourth-sub-pattern; and controlling the first sensor to perform the misregistration detection on the third-sub-pattern and controlling the second sensor to perform the misregistration detection on the fourth-sub-pattern.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in following description are merely some embodiments of the present disclosure. For those skilled in the art, other drawings may be obtained in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

Terms used in embodiments of the present disclosure are only for the purpose of describing specific embodiments and are not intended to limit the present disclosure. Singular forms "a", "said" and "the" used in embodiments of the present disclosure and the appended claims are also intended to include plural forms unless the context clearly indicates otherwise.

It should be understood that the term "and/or" used herein is only an association relationship describing associated objects, indicating that there may be three relationships. For example, A and/or B may indicate that A exists alone, A and B exist simultaneously, and B exists alone. In addition, the character "/" in the present disclosure may indicate that contextual objects are in an "or" relationship.

It should be understood that although terms such as "first", "second", and "third" may be configured to describe terminals in embodiments of the present disclosure, these terminals should not be limited to above-mentioned terms. Above-mentioned terms may only be configured to distinguish one terminal from another. For example, without departing from the scope of embodiments of the present disclosure, the first terminal may also be called the second terminal; and similarly, the second terminal may also be called the first terminal.

Depending on the context, the word "if" as used herein may be interpreted as "at" or "when" or "in response to determining" or "in response to detect". Similarly, depending on context, the phrase "if determined" or "if detected (the stated condition or event)" may be interpreted as "when determined" or "in response to determining" or "when detected (the stated condition or event)" or "in response to detection of (the stated condition or event)".

Figure 1:
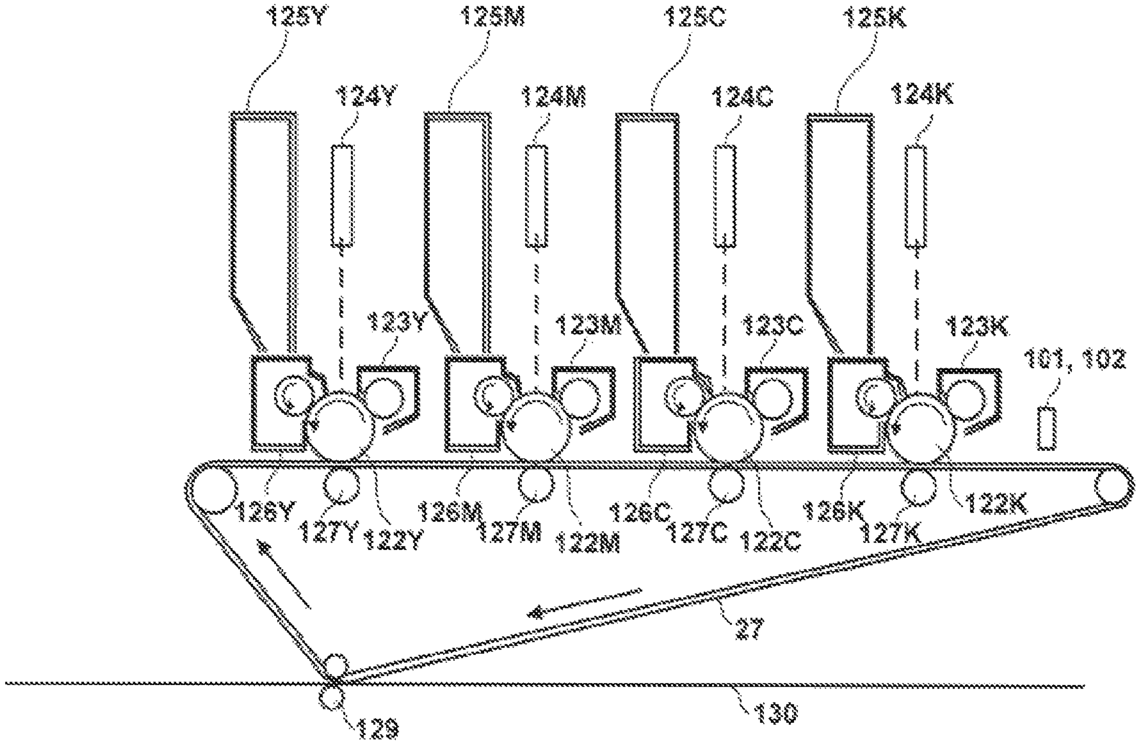
FIG. 1 illustrates a structural schematic of an image-forming apparatus according to exemplary embodiments of the present disclosure.

FIG. 1 illustrates a structural schematic of an image-forming apparatus according to exemplary embodiments of the present disclosure. Referring to FIG. 1, labels Y, M, C, and K in FIG. 1 are yellow, magenta, cyan, and black, respectively. When it is not necessary to distinguish colors in the description of embodiments of the present disclosure, no reference signs may be labeled. The arrows in FIG. 1 may indicate the rotation directions of corresponding drive parts.

A photosensitive part 122 may rotate along the direction of the arrow in FIG. 1. A charging part 123 may charge the surface of the corresponding photosensitive part 122 with a preset potential. A scanning unit 124 may scan and expose the photosensitive part 122 as an image carrier by using light based on image data corresponding to an image to be formed, thereby forming an electrostatic latent image on the surface of the photosensitive part 122. A developing unit 126 may store toner of a corresponding color and form an image by developing the electrostatic latent image on a corresponding photosensitive part 122 using the toner. A toner container 125 may store toner of a corresponding color and supply the toner to a corresponding developing unit 126. A primary transfer unit 127 may transfer the image formed on the photosensitive part 122 to an intermediate transfer part 27. At this point, a color image may be formed by transferring images of respective colors to the intermediate transfer part 27 in a superimposed manner. The intermediate transfer part 27 may rotate along the direction of the arrow in the drawing and convey the image on the surface of the intermediate transfer part 27 to the opposite position on a secondary transfer part 129. The image on the intermediate transfer part 27 may be transferred to a recording sheet which is conveyed along the conveying path 130 by the secondary transfer part 129.

In embodiments of the present disclosure, a density detection pattern and a (color) misregistration detection pattern formed by toner may be formed on the intermediate transfer part 27; and sensors 101 and 102 may be configured for detection. The sensors 101 and 102 may be disposed on two opposite sides of the intermediate transfer part 27, that is, on the left and right sides along the moving direction of the surface of the intermediate transfer part 27. For example, along the direction perpendicular to the moving direction of the surface of the intermediate transfer part 27, the first sensor 101 may be disposed at a position facing the vicinity of one end of the image-forming range, and the second sensor 102 may be disposed at a position opposite to the vicinity of the other end of the image-forming range.

Figure 2A:
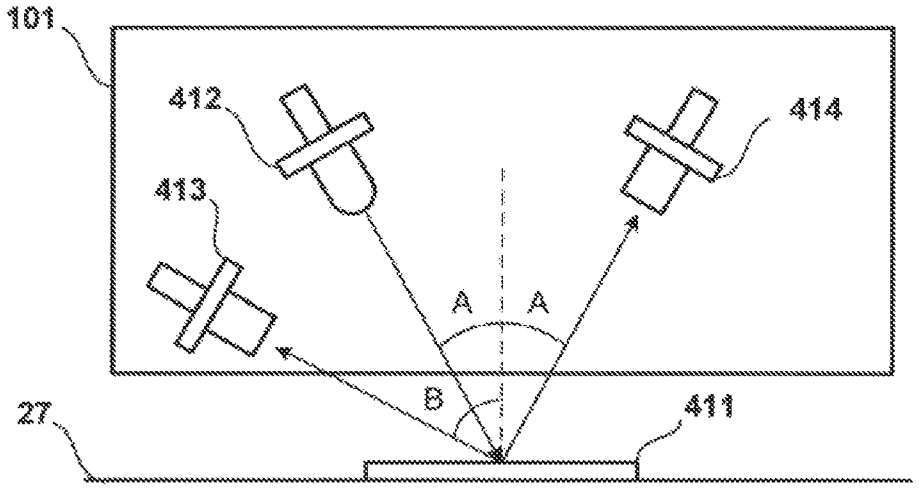
FIG. 2A illustrates a structural schematic of a first sensor according to exemplary embodiments of the present disclosure.

FIG. 2A illustrates a structural schematic and a detection principle of the first sensor 101 according to exemplary embodiments of the present disclosure.

The first sensor 101 may include a specular reflection detection channel and a diffuse reflection detection channel. For example, a light-emitting element 412 may emit light at an angle A from the normal direction of the surface of the intermediate transfer part 27. The light emitted by the light-emitting element 412 may be reflected by the surface of the intermediate transfer part 27 and an image block 411 formed on the surface of the intermediate transfer part 27. A light-receiving element 414 of the specular reflection detection channel may be configured to receive light reflected in a direction at an angle A from the normal direction of the surface of the intermediate transfer part 27. A specular reflection P wave may be sensitive to black, but not to other colors (C, M, Y), such that the specular reflection detection channel may be configured to detect black (K) toner.

On the other hand, a light-receiving element 413 of the diffuse reflection detection channel may be configured to receive light reflected in a direction at an angle B, which is different from the angle A, from the normal direction of the surface of the intermediate transfer part 27. A diffuse reflection S wave may not be sensitive to black, but sensitive to other colors (C, M, Y), such that the diffuse reflection detection channel may be configured to detect color (C, M, Y) toner.

Figure 2B:
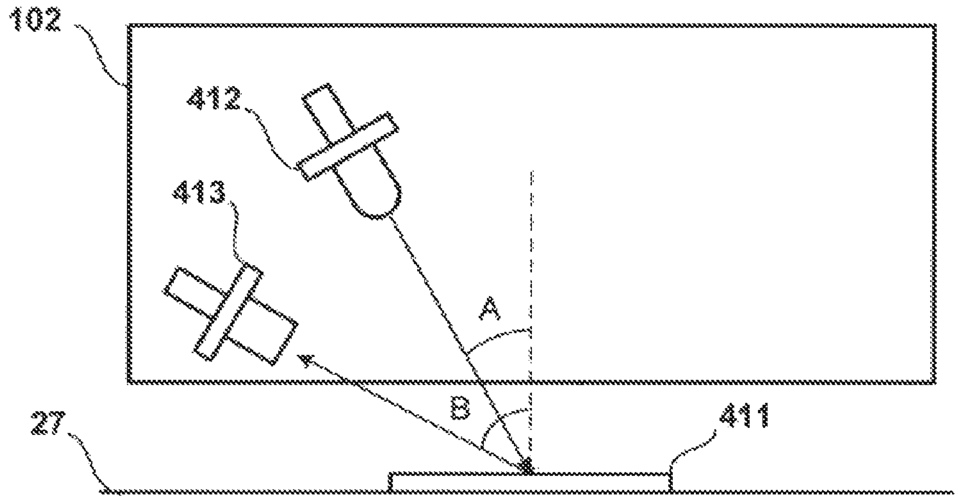
FIG. 2B illustrates a structural schematic of a second sensor according to exemplary embodiments of the present disclosure.

FIG. 2B illustrates a structural schematic and a detection principle of the second sensor 102 according to exemplary embodiments of the present disclosure.

The second sensor 102 may include a diffuse reflection detection channel. For example, the light-receiving element 413 of the diffuse reflection detection channel may be configured to receive light reflected in a direction at an angle B, which is different from the angle A, from the normal direction of the surface of the intermediate transfer part 27. The diffuse reflection S wave may not be sensitive to black, but sensitive to other colors (C, M, Y), such that the diffuse reflection detection channel may be configured to detect color (C, M, Y) toner.

In various embodiments of the present disclosure, an image-forming apparatus is further provided, which can perform density detection and misregistration detection in a same detection image and reduce time cost of detection and usage cost of sensors.

For example, embodiments of the present disclosure provide an image-forming apparatus.

The image-forming apparatus may include an image carrier; a pattern-forming unit, configured to form a first detection pattern for density detection on the image carrier, where the first detection pattern includes a black first-sub-pattern and a non-black second-sub-pattern; the first sensor, configured to detect the density of the first-sub-pattern; and the second sensor, configured to detect the density of the second-sub-pattern. The pattern-forming unit may be also configured to form a second detection pattern for misregistration detection on the image carrier. The second detection pattern may include a full-color third-sub-pattern and a full-color fourth-sub-pattern, where the third-sub-pattern may be different from the fourth-sub-pattern. The first sensor may also be configured to detect misregistration of the third-sub-pattern. The second sensor may also be configured to detect misregistration of the fourth-sub-pattern.

In the image-forming apparatus provided in embodiments of the present disclosure, the first detection pattern for density detection may be formed on the image carrier; the first detection pattern may include the black first-sub-pattern and the non-black second-sub-pattern; the first sensor may be controlled to perform density detection on the first-sub-pattern, and the second sensor may be controlled to perform density detection on the second-sub-pattern, thereby completing density detection. In such solution, the second detection pattern may be formed for misregistration detection on the image carrier; the second detection pattern may include the third-sub-pattern and the fourth-sub-pattern; the first sensor may be controlled to perform misregistration detection on the third-sub-pattern; and the second sensor may be controlled to perform misregistration detection on the fourth-sub-pattern. Therefore, density correction and misregistration detection may be performed simultaneously, which may reduce time cost of correction. Meanwhile, the third-sub-pattern may be different from the fourth-sub-pattern, and there is no need to configure the specular reflection detection channel and the diffuse reflection detection channel on both the first sensor and the second sensor, thereby reducing usage cost of the sensor.

In embodiments of the present disclosure, the image-forming apparatus and its detection process of density detection and misregistration detection are described in detail hereinafter.

For example, the image-forming apparatus may include the image carrier. In embodiments of the present disclosure, the image carrier may be, but not limited to, the intermediate transfer part 27 (intermediate conveying belt). The intermediate conveying belt may be a belt for conveying supplied print paper, and the detection pattern for detection may be formed on the surface of the print paper in the case that transferred image is not received. The image carrier may also be a medium such as paper directly.

The image-forming apparatus may further include the pattern-forming unit. The pattern-forming unit may include the photosensitive part 122, the charging part 123, the scanning unit 124, the developing unit and the like which correspond to each color and may be configured to form detection pattern on the intermediate conveying belt. The pattern-forming unit may further include a needed control unit to control individual parts to cooperate with each other. The pattern-forming unit may further include a storage unit for storing preset detection pattern.

Figure 3:
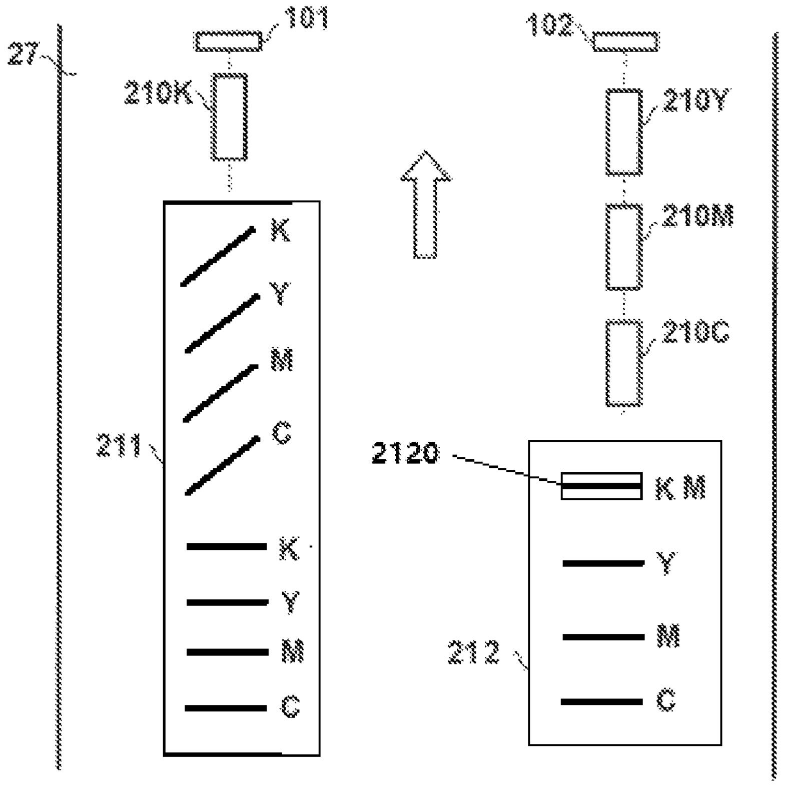
FIG. 3 illustrates a schematic of image detection according to exemplary embodiments of the present disclosure.

FIG. 3 illustrates a detection schematic of the pattern-forming unit forming patterns on the intermediate transfer part 27 according to exemplary embodiments of the present disclosure.

The arrow direction in FIG. 3 is the moving direction of the surface of the intermediate transfer part 27. The first sensor 101 may detect the detection pattern on one side of the moving direction of the intermediate transfer part 27. The second sensor 102 may detect the detection pattern on another side of the moving direction of the intermediate transfer part 27.

As shown in FIG. 3, the pattern-forming unit may form the first-sub-pattern and the third-sub-pattern on one side of the image carrier and form the second-sub-pattern and the fourth-sub-pattern on another side of the image carrier.

For example, the first-sub-pattern may be a black pattern, for example, a black color block 210K, and the first sensor 101 may perform density detection on the black color block based on the specular reflection detection channel.

The second-sub-pattern may be a non-black pattern, including a yellow color block 210Y, a magenta color block 210M and a cyan color block 210C; and the second sensor 102 may perform density detection of each non-black color block based on the diffuse reflection detection channel.

In embodiments of the present disclosure, the image-forming apparatus may include the plurality of image-forming units, and multicolor images may be formed by forming images of various colors using the image-forming units and then transferring the images to an intermediate transfer part or a recording material in a superimposed manner. Color shift and misregistration, that is, relative positional mismatch between images formed by the image-forming units, may occur in such type of image-forming apparatus. Misregistration may occur due to installation errors of parts of the image-forming units, and relative position changes of such parts due to changes in environmental conditions such as temperature. Misregistration may also occur due to uneven rotation of rotating driven parts, rotation speed change, and the like. In addition, color balance (e.g., tone) may change due to changes in image density of each color caused by conditions such as usage environment and the number of printed sheets.

The second detection pattern may be configured for the sensor to complete the misregistration detection. In the misregistration detection, the sensor may need to detect the offset of other colors relative to a reference color, and the reference color may be any color. In embodiments of the present disclosure, the reference color may be black as an example.

The second detection pattern may include a full-color third-sub-pattern 211 and a full-color fourth-sub-pattern 212.

Both the third-sub-pattern 211 and the fourth-sub-pattern 212 may include at least one set of detection patterns to detect the offset of C, M, Y relative to K color. Taking 211 in FIG. 3 as an example, the third-sub-pattern 211 may include a set of oblique lines of various colors and a set of horizontal lines of various colors.

The first sensor 101 may detect the third-sub-pattern 211. The first sensor 101 may include the specular reflection detection channel and the diffuse reflection detection channel; and the first sensor may perform the misregistration detection on the full-color third-sub-pattern based on the specular reflection detection channel and the diffuse reflection detection channel.

The fourth-sub-pattern 212 may include patterns of non-black colors (C, M, Y) and a pattern 2120 that one of the non-black colors is superimposed with black, which is shown as that magenta M is superimposed with black K in embodiments of the present disclosure. The second sensor 102 may include the diffuse reflection detection channel, which may detect C, M, and Y colors in the fourth-sub-pattern 212. The second sensor 102 may also detect the superimposed pattern of magenta M and black K, and the color of the superimposed pattern is regarded as black, thereby further detecting the offset of C, M, Y relative to K color and completing the misregistration detection.

Figure 4:
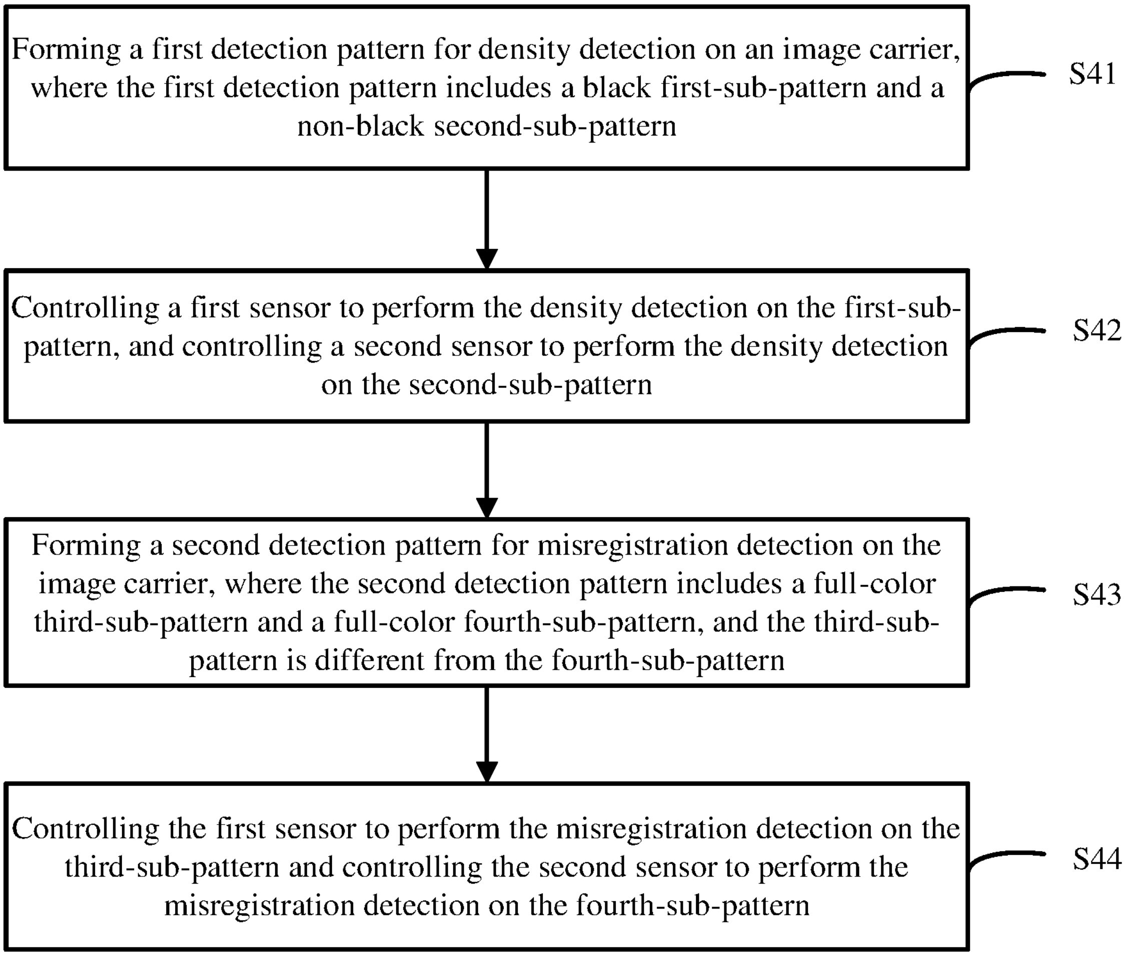
FIG. 4 illustrates a flowchart of a correction control method according to exemplary embodiments of the present disclosure.

Referring to FIG. 4, a correction control method is provided in one embodiment of the present disclosure.

At S41, the first detection pattern for density detection may be formed on the image carrier of the image-forming apparatus. The first detection pattern may include the black first-sub-pattern and the non-black second-sub-pattern.

At S42, the first sensor may be controlled to perform density detection of the first-sub-pattern, and the second sensor may be controlled to perform density detection of the second-sub-pattern.

At S43, the second detection pattern for misregistration detection may be formed on the image carrier. The second detection pattern may include the full-color third-sub-pattern and the full-color fourth-sub-pattern, and the third-sub-pattern may be different from the fourth-sub-pattern.

At S44, the first sensor may be controlled to perform misregistration detection on the third-sub-pattern, and the second sensor may be controlled to perform misregistration detection on the fourth-sub-pattern.

In correction control method provided in embodiments of the present disclosure, the first detection pattern for density detection may be formed on the image carrier; the first detection pattern may include the black first-sub-pattern and the non-black second-sub-pattern; the first sensor may be controlled to perform density detection on the first-sub-pattern, and the second sensor may be controlled to perform density detection on the second-sub-pattern, thereby completing density detection. In such solution, the second detection pattern may be formed for misregistration detection on the image carrier; the second detection pattern may include the third-sub-pattern and the fourth-sub-pattern; the first sensor may be controlled to perform misregistration detection on the third-sub-pattern; and the second sensor may be controlled to perform misregistration detection on the fourth-sub-pattern. Therefore, density correction and misregistration detection may be performed simultaneously, which may reduce time cost of correction. Meanwhile, the third-sub-pattern may be different from the fourth-sub-pattern, and there is no need to configure the specular reflection detection channel and the diffuse reflection detection channel on both the first sensor and the second sensor, thereby reducing usage cost of the sensor.

In embodiments of the present disclosure, above-mentioned correction control method is described in detail hereinafter.

Above-mentioned correction control method described may be applied to the image-forming apparatus.

For example, the image-forming apparatus may include the image carrier. In embodiments of the present disclosure, the image carrier may be, but not limited to, the intermediate transfer part 27 (intermediate conveying belt). The intermediate conveying belt may be a belt for conveying supplied print paper, and the detection pattern for detection may be formed on the surface of the print paper in the case that transferred image is not received. The image carrier may also be a medium such as paper directly.

The image-forming apparatus may further include the pattern-forming unit. The pattern-forming unit may include the photosensitive part 122, the charging part 123, the scanning unit 124, the developing unit and the like which correspond to each color and may be configured to form detection pattern on the intermediate conveying belt. The pattern-forming unit may further include a needed control unit to control individual parts to cooperate with each other. The pattern-forming unit may further include a storage unit for storing preset detection pattern.

FIG. 3 illustrates a detection schematic of the pattern-forming unit forming patterns on the intermediate transfer part 27 according to exemplary embodiments of the present disclosure.

The arrow direction in FIG. 3 is the moving direction of the surface of the intermediate transfer part 27. The first sensor 101 may detect the detection pattern on one side of the moving direction of the intermediate transfer part 27. The second sensor 102 may detect the detection pattern on another side of the moving direction of the intermediate transfer part 27.

As shown in FIG. 3, the pattern-forming unit may form the first-sub-pattern and the third-sub-pattern on one side of the image carrier and form the second-sub-pattern and the fourth-sub-pattern on another side of the image carrier.

For example, the first-sub-pattern may be a black pattern, for example, a black color block 210K, and the first sensor 101 may perform density detection on the black color block based on the specular reflection detection channel.

The second-sub-pattern may be a non-black pattern, including a yellow color block 210Y, a magenta color block 210M and a cyan color block 210C; and the second sensor 102 may perform density detection of each non-black color block based on the diffuse reflection detection channel.

In embodiments of the present disclosure, the image-forming apparatus may include the plurality of image-forming units, and multicolor images may be formed by forming images of various colors using the image-forming units and then transferring the images to an intermediate transfer part or a recording material in a superimposed manner. Color shift and misregistration, that is, relative positional mismatch between images formed by the image-forming units, may occur in such type of image-forming apparatus. Misregistration may occur due to installation errors of parts of the image-forming units, and relative position changes of such parts due to changes in environmental conditions such as temperature. Misregistration may also occur due to uneven rotation of rotating driven parts, rotation speed change, and the like. In addition, color balance (e.g., tone) may change due to changes in image density of each color caused by conditions such as usage environment and the number of printed sheets.

The second detection pattern may be configured for the sensor to complete the misregistration detection. In the misregistration detection, the sensor may need to detect the offset of other colors relative to a reference color, and the reference color may be any color. In embodiments of the present disclosure, the reference color may be black as an example.

The second detection pattern may include a full-color third-sub-pattern 211 and a full-color fourth-sub-pattern 212.

Both the third-sub-pattern 211 and the fourth-sub-pattern 212 may include at least one set of detection patterns to detect the offset of C, M, Y relative to K color. Taking 211 in FIG. 3 as an example, the third-sub-pattern 211 may include a set of oblique lines of various colors and a set of horizontal lines of various colors.

The first sensor 101 may detect the third-sub-pattern 211. The first sensor 101 may include the specular reflection detection channel and the diffuse reflection detection channel; and the first sensor may perform the misregistration detection on the full-color third-sub-pattern based on the specular reflection detection channel and the diffuse reflection detection channel.

The fourth-sub-pattern 212 may include patterns of non-black colors (C, M, Y) and a pattern that one of the non-black colors is superimposed with black, which is shown as that magenta M is superimposed with black K in embodiments of the present disclosure. The second sensor 102 may include the diffuse reflection detection channel, which may detect C, M, and Y colors in the fourth-sub-pattern 212. The second sensor 102 may also detect the superimposed pattern of magenta M and black K, and the color of the superimposed pattern is regarded as black, thereby further detecting the offset of C, M, Y relative to K color and completing the misregistration detection.

In another aspect of the present disclosure, embodiments of the present disclosure provide a computer-readable storage medium. The storage medium may include a stored program; and when the program is executed, the device where the storage medium is located may be controlled to execute above-mentioned correction control method.

Figure 5:
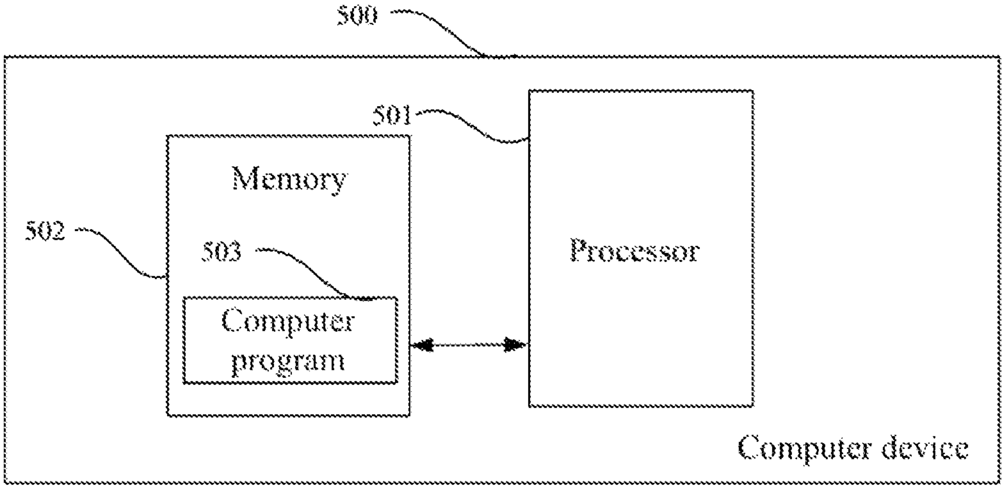
FIG. 5 illustrates a schematic of a computer device according to exemplary embodiments of the present disclosure.

In another aspect of the present disclosure, embodiments of the present disclosure provide a computer device. FIG. 5 illustrates a schematic of a computer device according to exemplary embodiments of the present disclosure. As shown in FIG. 5, a computer device 500 in one embodiment may include a processor 501, a memory 502, and a computer program 503 which is stored in the memory and capable of being executed on the processor 501. The correction control method in various embodiments may be implemented when the processor 501 executes the computer program 503, which may not be described in detail to avoid repetition. Or, when the computer program is executed by the processor 501, the functions of each model/unit in a network distribution apparatus in embodiments may be realized, which may not be described in detail to avoid repetition.

The computer device 500 may be a computing device such as a desktop computer, a notebook, a palmtop computer, a cloud server, or an image-forming apparatus. The computer device may include, but not limited to, the processor 501 and the memory 502. Those skilled in the art can understand that FIG. 5 is only an example of the computer device 500, which may not limit the computer device 500. The computer device may include more or fewer parts than those shown in drawings, combine certain parts or use different parts. For example, the computer device may also include input and output devices, network access devices, buses, and the like.

The processor 501 may be a central processing unit (CPU) and may also be a general-purpose processor, a digital signal processor (DSP), an application specific integrated circuit (ASIC), a field-programmable gate array (FPGA), other programmable logic device, a discrete gate or transistor logic device, a discrete hardware part, and/or the like. A general-purpose processor may be a microprocessor, or the processor may be any conventional processor or the like.

The memory 502 may be an internal storage unit of the computer device 500, such as a hard disk or a memory of the computer device 500. The memory 502 may also be an external storage device of the computer device 500, such as a plug-in hard disk equipped on the computer device 500, a smart media card (SMC), a secure digital (SD) card, a Flash card, or the like. Furthermore, the memory 502 may also include both an internal storage unit of the computer device 500 and an external storage device. The memory 502 may be configured to store computer programs and other programs and data required by the computer device. The memory 502 may also be configured to temporarily store data that has been outputted or will be outputted.

From above-mentioned embodiments, it may be seen that the solutions according to the present disclosure may achieve at least following beneficial effects.

According to the image-forming apparatus and the correction control method provided in embodiments of the present disclosure, the first detection pattern for density detection may be formed on the image carrier; the first detection pattern may include the black first-sub-pattern and the non-black second-sub-pattern; the first sensor may be controlled to perform density detection on the first-sub-pattern, and the second sensor may be controlled to perform density detection on the second-sub-pattern, thereby completing density detection. In such solution, the second detection pattern may be formed for misregistration detection on the image carrier; the second detection pattern may include the third-sub-pattern and the fourth-sub-pattern; the first sensor may be controlled to perform misregistration detection on the third-sub-pattern; and the second sensor may be controlled to perform misregistration detection on the fourth-sub-pattern. Therefore, density correction and misregistration detection may be performed simultaneously, which may reduce time cost of correction. Meanwhile, the third-sub-pattern may be different from the fourth-sub-pattern, and there is no need to configure the specular reflection detection channel and the diffuse reflection detection channel on both the first sensor and the second sensor, thereby reducing usage cost of the sensor.

Those skilled in the art can clearly understand that for the convenience and brevity of description, the working process of above-described system, apparatus and unit can refer to corresponding process in above-mentioned method embodiments, which may not be described in detail herein.

In some embodiments provided in the present disclosure, it should be understood that the disclosed system, apparatus and method may be implemented in other manners. For example, apparatus embodiments described above may be only exemplary. For example, the division of the unit may be only a logical function division, and there may be another division manner during actual implementation. For example, multiple units or parts may be combined or integrated into another system, or some features may be omitted or not implemented. In addition, mutual coupling or direct coupling or communication connection shown or discussed above may be indirect coupling or communication connection through some interfaces, apparatus or units; and may be electrical, mechanical or other manners.

Above-mentioned integrated units implemented in the form of software functional units may be stored in a computer-readable storage medium. Above-mentioned software functional units may be stored in a storage medium, which may include a plurality of instructions to make a computer device (which may be a personal computer, a server, a network device or the like) or a processor execute some steps of above-mentioned methods in various embodiments of the present disclosure. Above-mentioned storage media may include U disk, mobile hard disk, read-only memory (ROM), random access memory (RAM), magnetic disk or optical disk and other media that can store program codes.

Above-mentioned embodiments of the present disclosure may be exemplary and may not be intended to limit the present disclosure. Any modifications, equivalent replacements, improvements and the like made within the spirit and principles of the present disclosure shall be included within the protection scope of the present disclosure.

What is claimed is:

1. An image-forming apparatus, comprising:
an image carrier;
a pattern-forming unit, configured to:
form a first detection pattern for density detection on the image carrier, wherein the first detection pattern includes a black first-sub-pattern and a non-black second-sub-pattern; and
form a second detection pattern for misregistration detection on the image carrier, wherein the second detection pattern includes a full-color third-sub-pattern and a full-color fourth-sub-pattern, the third-sub-pattern and the fourth-sub-pattern are disposed at two sides of the image carrier, and the third-sub-pattern is different from the fourth-sub-pattern;
a first sensor, configured to perform the density detection on the first-sub-pattern and the misregistration detection on the third-sub-pattern; and
a second sensor, configured to perform the density detection on the second-sub-pattern, and the misregistration detection on the fourth-sub-pattern,
wherein:
the fourth-sub-pattern includes a non-black pattern including a cyan color line, a magenta color line and a yellow color line, and a pattern after superimposing of one type of non-black colors with black color.

2. The apparatus according to claim 1, wherein:
the pattern-forming unit is configured to form the first-sub-pattern and the third-sub-pattern on a side of the image carrier and form the second-sub-pattern and the fourth-sub-pattern on another side of the image carrier.

3. The apparatus according to claim 1, wherein:
the first sensor includes a specular reflection detection channel configured to perform the density detection on the black first-sub-pattern based on the specular reflection detection channel; and
the first sensor further includes a diffuse reflection detection channel configured to perform the misregistration detection on the full-color third-sub-pattern based on the specular reflection detection channel and the diffuse reflection detection channel.

4. The apparatus according to claim 1, wherein:
the second sensor includes a diffuse reflection detection channel configured to perform the density detection on the non-black second-sub-pattern based on the diffuse reflection detection channel; and
the second sensor is further configured to perform the misregistration detection on a non-black pattern in the fourth sub-pattern and a pattern after superimposing of one type of non-black colors with black color based on the diffuse reflection detection channel.

5. A correction control method, comprising:
forming a first detection pattern for density detection on an image carrier, wherein the first detection pattern includes a black first-sub-pattern and a non-black second-sub-pattern;
controlling a first sensor to perform the density detection on the first-sub-pattern, and controlling a second sensor to perform the density detection on the second-sub-pattern;
forming a second detection pattern for misregistration detection on the image carrier, wherein the second detection pattern includes a full-color third-sub-pattern and a full-color fourth-sub-pattern, the third-sub-pattern and the fourth-sub-pattern are disposed at two sides of the image carrier, and the third-sub-pattern is different from the fourth-sub-pattern; and
controlling the first sensor to perform the misregistration detection on the third-sub-pattern and controlling the second sensor to perform the misregistration detection on the fourth-sub-pattern,
wherein:
the fourth-sub-pattern includes a non-black pattern including a cyan color line, a magenta color line and a yellow color line, and a pattern after superimposing of one type of non-black colors with black color.

6. The method according to claim 5, further including:
forming the first-sub-pattern and the third-sub-pattern on a side of the image carrier and forming the second-sub-pattern and the fourth-sub-pattern on another side of the image carrier.

7. The method according to claim 5, wherein:
the first sensor includes a specular reflection detection channel and is configured to perform the density detection on the black first-sub-pattern based on the specular reflection detection channel; and
the first sensor further includes a diffuse reflection detection channel and is configured to perform the misregistration detection on the full-color third-sub-pattern based on the specular reflection detection channel and the diffuse reflection detection channel.

8. The method according to claim 5, wherein:
the second sensor includes a diffuse reflection detection channel and is configured to perform the density detection on the non-black second-sub-pattern based on the diffuse reflection detection channel; and
the second sensor is further configured to perform the misregistration detection on a non-black pattern in the fourth sub-pattern and a pattern after superimposing of one type of non-black colors with black color based on the diffuse reflection detection channel.

9. A non-transitory computer-readable storage medium containing a computer program that, when being executed by a processor, causes the processor to implement a correction control method, wherein the correction control method comprises:

forming a first detection pattern for density detection on an image carrier, wherein the first detection pattern includes a black first-sub-pattern and a non-black second-sub-pattern;

controlling a first sensor to perform the density detection on the first-sub-pattern, and controlling a second sensor to perform the density detection on the second-sub-pattern;

forming a second detection pattern for misregistration detection on the image carrier, wherein the second detection pattern includes a full-color third-sub-pattern and a full-color fourth-sub-pattern, the third-sub-pattern and the fourth-sub-pattern are disposed at two sides of the image carrier, and the third-sub-pattern is different from the fourth-sub-pattern; and controlling the first sensor to perform the misregistration detection on the third-sub-pattern and controlling the second sensor to perform the misregistration detection on the fourth-sub-pattern, wherein:

the fourth-sub-pattern includes a non-black pattern including a cyan color line, a magenta color line and a yellow color line, and a pattern after superimposing of one type of non-black colors with black color.

10. The non-transitory computer-readable storage medium according to claim 9, wherein the method further includes:

forming the first-sub-pattern and the third-sub-pattern on a side of the image carrier and forming the second-sub-pattern and the fourth-sub-pattern on another side of the image carrier.

11. The non-transitory computer-readable storage medium according to claim 9, wherein:

the first sensor includes a specular reflection detection channel and is configured to perform the density detection on the black first-sub-pattern based on the specular reflection detection channel; and the first sensor further includes a diffuse reflection detection channel and is configured to perform the misregistration detection on the full-color third-sub-pattern based on the specular reflection detection channel and the diffuse reflection detection channel.

12. The non-transitory computer-readable storage medium according to claim 9, wherein:

the second sensor includes a diffuse reflection detection channel and is configured to perform the density detection on the non-black second-sub-pattern based on the diffuse reflection detection channel; and the second sensor is further configured to perform the misregistration detection on a non-black pattern in the fourth sub-pattern and a pattern after superimposing of one type of non-black colors with black color based on the diffuse reflection detection channel.

* * * * *